United States Patent [19]

Barnes et al.

[11] Patent Number: 5,516,211
[45] Date of Patent: May 14, 1996

[54] BALL TRANSFER UNIT

[75] Inventors: Dennis J. Barnes, Charlotte; Douglas K. Leirmoe, Weddington, both of N.C.; Kenneth J. Piecuch, Lake Wylie, S.C.

[73] Assignee: The Rexroth Corporation, Bethlehem, Pa.

[21] Appl. No.: 508,976

[22] Filed: Jul. 28, 1995

[51] Int. Cl.⁶ ............................. F16C 29/04; B65G 13/00
[52] U.S. Cl. ........................................ 384/49; 193/35 MD
[58] Field of Search ........................ 384/49; 193/35 MD

[56] References Cited

U.S. PATENT DOCUMENTS

| | | | |
|---|---|---|---|
| 1,963,956 | 6/1934 | Craig | 384/49 X |
| 2,972,162 | 2/1961 | Townsend | 384/49 X |
| 4,285,550 | 8/1981 | Blackburn et al. | 384/49 |
| 4,402,108 | 9/1983 | Pannwitz | 384/49 X |
| 4,553,795 | 11/1985 | Takagi | 384/49 |
| 4,696,583 | 9/1987 | Gorges | 384/49 |
| 4,778,041 | 10/1988 | Blaurock | 193/35 MD |
| 4,871,052 | 10/1989 | Huber | 193/35 MD |
| 4,961,650 | 10/1990 | Schwarzbich | 384/49 |
| 5,033,601 | 7/1991 | Huber | 193/35 MD |
| 5,076,412 | 12/1991 | Huber | 193/35 MD |
| 5,096,308 | 3/1992 | Sundseth | 384/49 |
| 5,219,058 | 6/1993 | Sundseth | 193/35 MD |
| 5,297,663 | 3/1994 | Sundseth | 193/35 MD |
| 5,375,679 | 12/1994 | Biehl | 384/49 |

*Primary Examiner*—Thomas R. Hannon
*Attorney, Agent, or Firm*—Bell, Seltzer, Park & Gibson

[57] ABSTRACT

A ball transfer unit for use in a conveyor track for material handling applications, such as the movement and handling of freight, comprising a housing which contains a conveyor ball supported by the surface of a plurality of ball bearings. The ball transfer unit also comprises a floating annular seal such that the seal is continuously biased against the conveyor ball to prevent the introduction of fluids, contaminants, and harmful chemicals into the race of the ball transfer unit.

11 Claims, 1 Drawing Sheet

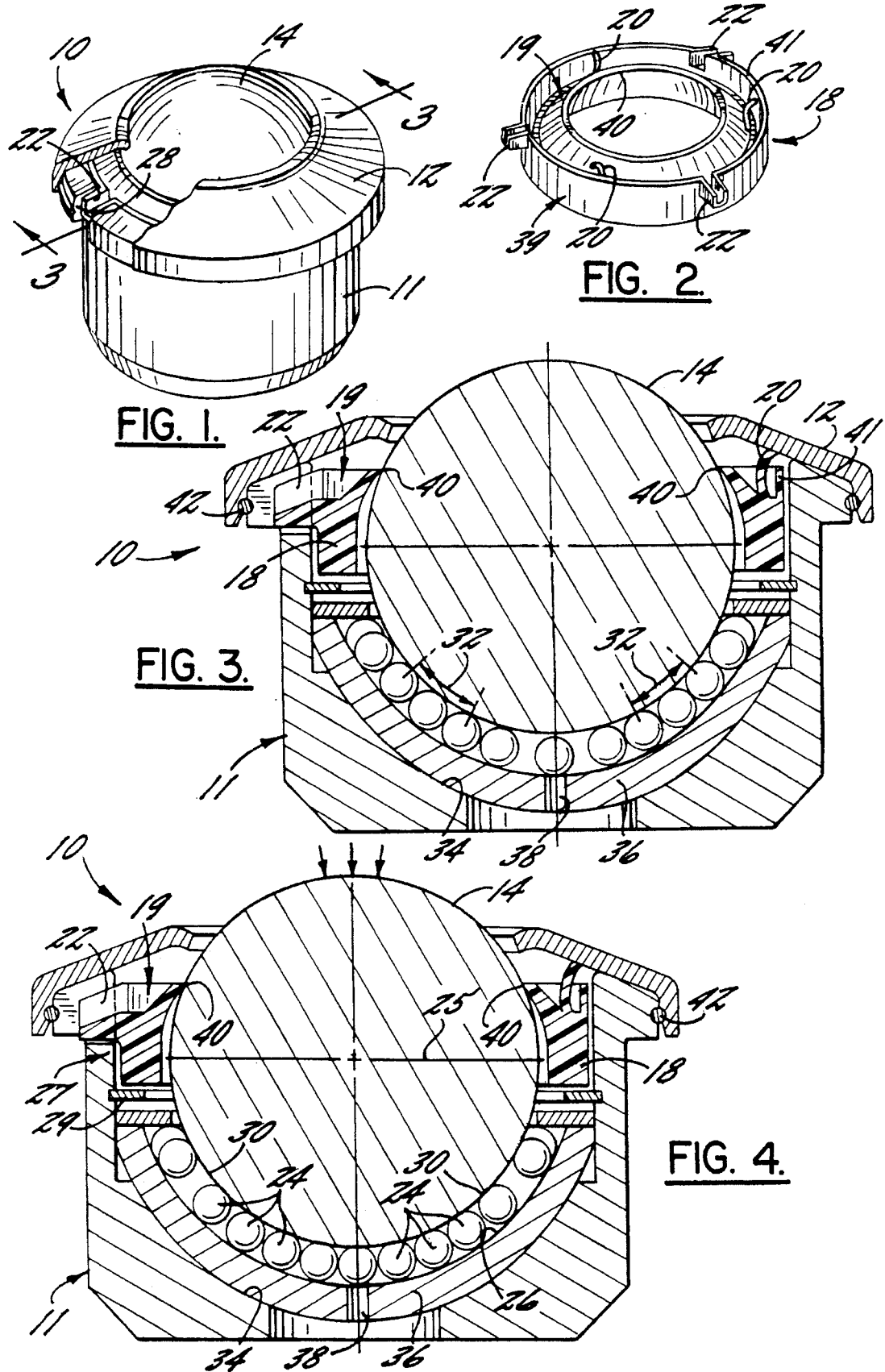

BALL TRANSFER UNIT

FIELD OF THE INVENTION

The present invention relates to a ball transfer unit to be used for material handling applications and having a floating contaminant seal.

BACKGROUND OF THE INVENTION

Ball transfer units, sometimes referred to as conveyor ball units, are commonly used in connection with conveyor tracks for the movement or handling of freight, such as the loading and unloading of cargo from an aircraft. Multiple ball transfer units collectively provide a surface over which the cargo may be moved with a minimum amount of friction. Ball transfer units are also utilized on machine tools, such as stamping presses, to transfer the stock through the machining area.

A ball transfer unit, such as the type described in U.S. Pat. No. 5,297,663 to Sundseth, comprises a conveyor ball resting on a plurality of ball bearings in a housing. The conveyor ball and the plurality of ball bearings are located within a mounting shell so as to maintain the position of the conveyor ball and ball bearings within the housing. In addition, a retaining ring is provided to keep the conveyor ball in position on the ball bearings within the mounting shell. The conveyor ball is positioned so as to permit its rotation when material is moved along the conveyor track over the ball transfer unit.

Due to their application, conveyor tracks, and thus ball transfer units, are often subjected to significant forces. Such ball transfer units must be designed to be rugged so as to withstand these loads. Some ball transfer units are designed to allow for limited upward and downward movement of the mounting shell for absorbing such compressive loads on the conveyor ball. For example, the mounting shell and the retaining ring as disclosed in U.S. Pat. No. 5,219,058 are mounted on a helical spring such that the retaining ring may move upward and downward with the conveyor ball within the housing. The '058 patent discloses this movement for the purpose of absorbing compressive loads on the conveyor ball.

An ultimate goal of the ball transfer unit is to provide anti-friction qualities that will improve the operation and efficiency of the conveyor track. Ball transfer units currently known in the art are often subjected to corrosive chemicals, particulate contaminants, and fluids which enter the race of the housing and cause the surface of the conveyor ball to corrode and wear. The corrosion and wear of the conveyor ball can significantly restrict the anti-friction qualities of the ball transfer unit, and thus significantly diminish the efficiency of the conveyor track. To protect the conveyor ball, a seal is commonly used to wipe the ball as it rolls to prevent fluids and contaminants from entering the race. Typically, such a seal would have a close tolerance fit with the outer periphery of the conveyor ball, such as the edge of the aperture described in U.S. Pat. No. 1,963,956 to Craig. This close tolerance fit, however, cannot account for imprecisions in the manufacturing of the ball, uneven wear of the ball which occurs during its service life, or deflection of the ball due to the force of excessive loads. Consequently, corrosive chemicals, particulate contaminants, and fluids manage to pass between such seals and the ball, enter the race, and degrade the anti-friction qualities of the ball transfer unit. In fact, the patentee of the '956 patent described how foreign matter such as dust would accidentally find its way into the race of the unit. Realizing such accidental introduction of foreign matter would occur, said patent provided for an aperture to dispel such matter once it had been worked into the bottom of the race by the ball bearings. This does not, however, preclude the matter from degrading the conveyor ball.

When such seals do manage to prevent the introduction of such chemicals or contaminants from entering the race of the ball transfer unit, the art provides no mechanism for subsequently expelling or eliminating such matter from the exterior of the seal or ball transfer unit itself. The buildup of this matter on the seal of the ball transfer unit or on the ball transfer unit itself could also be detrimental to the operation of the unit in conjunction with the conveyor track.

Furthermore, because of the probable size of the conveyor track and the plurality of ball transfer units that would be used in such a track, it is necessary to design the ball transfer unit so as to minimize the difficulty and inconvenience of replacing a damaged ball transfer unit.

An object of the present invention is to provide a ball transfer unit which substantially alleviates the problems discussed above.

A further object of the present invention is to provide a ball transfer unit for a conveyor track which is able to support significant loads and forces which are commonly involved in the operation of such a ball transfer unit.

A further object of the invention is to provide a ball transfer unit which effectively prevents the introduction of chemicals and other contaminants into the race of the ball transfer unit.

A further object of the invention is to provide a ball transfer unit for a conveyor track which minimizes the difficulty and inconvenience of replacing an individual ball transfer unit in a conveyor track.

A more specific object of the invention is to provide a seal for a ball transfer unit that prevents the introduction of chemicals and other contaminants into the race of a ball transfer unit.

SUMMARY OF THE INVENTION

These and other objects are attained by the ball transfer unit of the present invention which comprises a housing, with the housing including a semi-spherical concave mounting surface. A plurality of ball bearings are positioned upon the mounting surface for rotatably supporting a conveyor ball. The conveyor ball is sized to generally conform to the curvature of the concave support surface and it defines an equator which lies in a horizontal plane. An annular resilient seal is mounted in the housing so as to contact the conveyor ball along a circle which is parallel to and above the equator of the conveyor ball. Also, an annular cover is mounted to the housing so as to overlie and substantially cover the annular seal, and means are interposed between the annular seal and the annular cover for biasing the annular seal downwardly into positive sealing engagement with the conveyor ball, and so as to maintain a sealing engagement therebetween and preclude contaminants and fluids from entering the race of the ball transfer unit and degrading the anti-friction qualities of the ball transfer unit.

The biasing means preferably comprises a plurality of upwardly directed resilient fingers which are integrally formed with the annular seal and extend into engagement with the annular cover. These resilient fingers serve to maintain the sealing engagement between the conveyor ball and the annular seal under both loaded and unloaded conditions of the ball transfer unit and to thereby preclude contaminants or fluids from entering the race of the ball transfer unit.

The annular seal is preferably formed of a resilient elastomeric material and comprises an annular body portion and an annular inner lip which extends upwardly and inwardly from the body portion and into contact with the conveyor ball at the above referenced circle. The inner lip is thus able to maintain sealing contact with the conveyor ball during movement and rotation of the ball. The annular seal preferably also comprises an annular outer lip extending upwardly from the body portion so as to define an upwardly open annular trough between the inner and outer lips. Also, the annular seal includes a plurality of channels extending radially outwardly from the outer lip and communicating with the trough for permitting the discharge of fluids and contaminants from the trough.

BRIEF DESCRIPTION OF THE DRAWINGS

Some of the objects and advantages of the present invention having been stated, others will appear when considered in conjunction with the accompanying drawings, in which:

FIG. 1 is a perspective view, partly broken away, of the ball transfer unit according to the invention;

FIG. 2 is a perspective view of the annular seal for the ball transfer unit according to the invention;

FIG. 3 is a sectional view of the ball transfer unit taken vertically along line 3—3 in FIG. 1 under non-loaded conditions; and FIG. 4 is a view similar to FIG. 3 but illustrating the ball transfer unit under loaded conditions.

DETAILED DESCRIPTION OF THE INVENTION

Referring generally to FIGS. 1–4, a conveyor ball unit 10 is shown, comprising a cup-like annular housing 11, upon which an annular cover 12 is positioned, and within which a conveyor ball 14 is positioned. Also, an annular seal 18, a perspective view of which is shown in FIG. 2, fits around the conveyor ball 14 underneath the annular cover 12 and inside the housing 11, as best depicted in FIGS. 3 and 4.

The housing 11 of the ball transfer unit 10 defines a semi-spherical concave bottom surface 34 upon which a semi-spherical concave bottom plate 36 is positioned. The housing 11 also includes an annular upstanding peripheral wall portion 27, and the upper edge of the wall portion 27 includes a plurality of radial slots 28 for the purposes described below. An aperture 38 is positioned through both the semi-spherical concave surface 34 and the semi-spherical concave bottom plate 36, as best shown in FIGS. 3 and 4. The upper surface of the concave bottom plate 36 forms a mounting surface 26, upon which a plurality of ball bearings 24 are positioned. The upper portions of the ball bearings 24 collectively define a concave support surface 30. The conveyor ball 14 is positioned upon the concave support surface 30, and the conveyor ball is sized to generally conform to the curvature of the concave support surface 30 and to define an equator 25 which lies in a horizontal plane and is disposed adjacent to an annular peripheral wall portion 27 of the housing 11 of ball transfer unit 10.

The housing 11 of the ball transfer unit 10 additionally comprises an annular retaining ring 29 positioned within the housing 11 parallel to the equator 25 of the conveyor ball 14 and above the ball bearings 24 so as to generally confine the ball bearings 24 to the mounting surface 26. The conveyor ball 14 rests upon the concave support surface 30 so as to contact the ball bearings 24 at an annular load zone depicted schematically at 32 in FIG. 3. The existence of the annular load zone 32 permits slight movements of the conveyor ball 14 when the unit 10 is under load conditions. It should be appreciated, although too small to be depicted in the drawings, that in accordance with conventional practice, the conveyor ball 14 contacts said ball bearings 24 only in the region of the annular load zone 32, under both no-load and load conditions of the ball transfer unit 10, and that there may be a slight spacing between the conveyor ball 14 and the ball bearings 24 in areas outside this annular load zone 32.

The annular seal 18 comprises an annular body portion 39 and annular inner lip 40 which extends upwardly and inwardly from the body portion 39 and into contact with the conveyor ball 14 along a circle which is parallel to and above the equator of the ball 14. The annular seal 18 also comprises an annular outer lip 41 extending upwardly from the body portion so as to define an upwardly open annular trough 19 between the annular inner lip 40 and the annular outer lip 41. Additionally, the annular seal 18 comprises a plurality of discharge channels 22 extending radially outwardly from the annular outer lip 41. The channels 22 are received in respective ones of the radial slots 28 formed in the wall portion 27 of the housing 11 so as to preclude relative rotation between the wall portion and the seal. The annular seal 18 further comprises a plurality of upwardly directed resilient fingers 20 which are integrally formed with the annular seal 18.

In operation, the resilient fingers 20 are interposed between the annular seal 18 and the annular cover 12, extending into engagement with the annular cover 12, for biasing the seal 18 downwardly into positive sealing engagement with the conveyor ball 14 so as to maintain a sealing engagement therebetween and preclude fluids and contaminants from entering the race of the ball transfer unit 10. The annular seal 18 contacts the conveyor ball 14 at the inner annular lip 40. The existence of this positive sealing engagement is best depicted in FIGS. 3 and 4.

The annular seal 18 is a floating seal, and thus not fixedly attached to the conveyor ball unit 5. This permits the annular seal 18 to move with the conveyor ball 14 when said conveyor ball is under load conditions. The simultaneous movement of the annular seal 18 with the conveyor ball 14 provides the continuous sealing engagement between the annular seal 18 and the conveyor ball 14 and thus precludes fluids and contaminants from entering the race of the ball transfer unit 10. These fluids and contaminants run along the annular trough 19 as defined by the inner lip 40 and outer lip 41 of the annular seal 18 and are discharged from the ball transfer unit 5 through the discharge channels 22.

The annular cover 12 is retained on peripheral wall portion 27 of the housing 11 of the ball transfer unit 10 by means of a snap lock ring 42. The annular cover 12 includes a circular opening which is closely adjacent but spaced from the conveyor ball 14, such that an upper portion of the conveyor ball 14 protrudes through the circular opening. The positioning of the annular cover 12 onto the housing 11 effects the positive sealing engagement between the annular seal 18 and the conveyor ball 14 by means of the resilient fingers 20. This positive sealing engagement between the annular seal 18 and the conveyor ball 14 exists when the ball transfer unit 5 is under a no-load condition as illustrated in FIG. 3.

When the ball transfer unit 5 is subjected to a load condition, as illustrated in FIG. 4, the positive sealing engagement between the annular seal 18 and the conveyor ball 14 is maintained. To maintain such engagement, the annular seal 18 floats down with the conveyor ball 14 by means of the extension of the resilient fingers 20. By maintaining this sealing engagement, the ball transfer unit 10 is able to discharge any fluids and contaminants from the unit, preventing them from entering the race of the ball transfer unit 5, as detailed above.

It will be appreciated that the biasing which the resilient fingers 20 provide can be alternatively furnished by the use of a plurality of springs or other such extensions positioned between the annular seal 18 and the cover 12.

It will be appreciated that the above-described constructions have been set forth solely by way of example and illustration and that various modifications and alterations may be made therein without thereby departing from the spirit and scope of the invention.

That which is claimed:

1. A ball transfer unit comprising a housing which includes a semi-spherical concave mounting surface, a plurality of ball bearings positioned upon said mounting surface, with the upper portions of the ball bearings collectively defining a concave support surface, a conveyor ball positioned to rotatably rest upon said concave support surface, said conveyor ball being sized to generally conform to the curvature of said concave support surface and to define an equator which lies in a horizontal plane, an annular seal formed of a resilient material and mounted in said housing so as to contact said conveyor ball along a circle which is parallel to and above the equator of said conveyor ball, an annular cover mounted to said housing so as to overlie and substantially cover said annular seal, and means interposed between said annular seal and said annular cover for biasing said annular seal downwardly into positive sealing engagement with said conveyor ball about said circle, and so as to maintain a sealing engagement therebetween.

2. The ball transfer unit as defined in claim 1 wherein said annular cover includes a circular opening which is closely adjacent but spaced from said conveyor ball about a second circle which is above and parallel to said first mentioned circle, and such that an upper portion of said conveyor ball protrudes through said opening.

3. The ball transfer unit as defined in claim 1 wherein said biasing means comprises a plurality of upwardly directed resilient fingers integrally formed with said annular seal and extending into engagement with said cover.

4. The ball transfer unit as defined in claim 1 wherein said housing mounts an annular retaining ring positioned parallel to the equator of said conveyor ball and above said ball bearings for confining said ball bearings to said mounting surface.

5. The ball transfer unit as defined in claim 1 wherein said conveyor ball rests on said concave support surface so as to contact said ball bearings at an annular load zone which is located along a third circle which is parallel to and below the equator of said conveyor ball.

6. The ball transfer unit as defined in claim 1 wherein said housing includes a semi-spherical concave base and a semi-spherical concave bottom plate which rests upon said concave base and which defines said concave mounting surface.

7. The ball transfer unit as defined in claim 1 wherein said housing includes an aperture in the lowermost portion of said housing to discharge fluids and contaminants from said ball transfer unit.

8. A ball transfer unit comprising a housing comprising a base portion which includes a semi-spherical concave mounting surface, and an annular upstanding peripheral wall portion extending peripherally about said concave mounting surface, a plurality of ball bearings positioned upon said mounting surface, with the upper portions of the ball bearings collectively defining a concave support surface, a conveyor ball positioned to rotatably rest upon said concave support surface, said conveyor ball being sized to generally conform to the curvature of said concave support surface and to define an equator which lies in a horizontal plane and is disposed adjacent said annular peripheral wall portion of said housing, an annular seal formed of a resilient elastomeric material and comprising an annular body portion and an annular inner lip, said annular seal being mounted between said conveyor ball and said peripheral wall portion of said housing so that said annular inner lip extends upwardly and inwardly from said body portion and into contact with said conveyor ball along a circle which is parallel to and above the equator of said conveyor ball, an annular cover mounted to said peripheral wall portion of said housing so as to overlie and substantially cover said annular seal, said annular cover including a circular opening which is closely adjacent but spaced from said conveyor ball about a second circle which is above and parallel to said first mentioned circle, and such that an upper portion of said conveyor ball protrudes through said opening, and means interposed between said annular seal and said cover for biasing said annular seal downwardly so that said annular inner lip is biased into positive sealing engagement with said conveyor ball about said circle, and so as to maintain the sealing engagement therebetween.

9. The ball transfer unit as defined in claim 8 wherein said biasing means comprises a plurality of upwardly directed resilient fingers integrally formed with said annular seal and extending into engagement with said cover.

10. The ball transfer unit as defined in claim 9 wherein said annular seal further comprises an annular outer lip extending upwardly from said body portion and coaxially outside said annular inner lip so as to define an upwardly open annular trough therebetween, and a plurality of channels extending radially outwardly from said outer lip and communicating with said trough for permitting the discharge of fluids and contaminants from said trough.

11. The ball transfer unit as defined in claim 10 wherein said peripheral wall portion of said housing includes a plurality of radial slots which receive respective ones of said channels so as to preclude relative rotation between said peripheral wall portion and said annular seal.

* * * * *